UNITED STATES PATENT OFFICE.

HENRY S. MYERS, OF NEW YORK, N. Y.

COPYING-PENCIL, &c.

SPECIFICATION forming part of Letters Patent No. 358,746, dated March 1, 1887.

Application filed October 19, 1885. Serial No. 180,299. (No specimens.)

*To all whom it may concern:*

Be it known that I, HENRY S. MYERS, a citizen of the United States, residing at New York city, in the county of New York, in the State of New York, have invented new and useful Improvements in Copying Pencils, Crayons, Pastels, Sticks, Tablets, and the Like, set forth in this specification.

The objects of my invention are the preparation of different materials or substances of color—such as black, red, blue, green, and yellow—and the colors or shades of color resulting from combinations of two or more thereof, so as to fit them for copying purposes, and to put the prepared colors into the shapes and forms of pieces or cores for pencils, crayons, pastels, sticks like india-ink, cakes, or tablets, like water-color paints, and such other forms as may be required to adapt them for the use of artists and scholars, for drawing and painting purposes, for making originals to be transferred to the "composition for copying," patented to me October 30, 1883, No. 287,457, and for general writing, drawing, and copying purposes.

Heretofore copying-pencils have been used that were made of aniline violet colors, which have the serious objection of being fugitive in their nature, fading and disappearing entirely if exposed to the atmosphere or light, rendering them unfit for permanent copying; and one purpose of my invention is to overcome this objection by producing pencils and other articles which will give permanent and durable copies in black, and other colors, that will remain under all ordinary conditions of exposure. To meet these objects it is necessary to have substances of color which can be made into a mass or powder which will be soluble in water, and capable of being united or combined with certain soluble or insoluble substances, or with both. To obtain such coloring-matters, I proceed as herein described.

To prepare the black color, an extract of logwood is made by any of the ordinary modes in use, or the extract of logwood as sold in the market may be employed, the semi-liquid extract being preferred to the solid; but in using either it is necessary to reduce it with water to about the consistency of thin cream. The quantity of water best to be used depends much upon the condition and character of the extract employed; but usually two parts of water to one part of the semi-liquid extract, or three to four parts of water to one of the solid extract, answers the purpose. The extract is first dissolved in two-thirds or three-quarters of the water to be used, and when the solution is fully completed about fifteen or twenty grains of the yellow chromate of potash are added for each fluid ounce of the semi-liquid extract employed, or about twenty to twenty-five grains for each ounce of the solid extract. The potash is added by degrees in the form of powder, the solution being well stirred as each addition is made. The solution is then strained through a sieve or strainer into a receiving-vessel, that portion remaining on the strainer being returned to the mixing-vessel and the balance of the water added to it, when it is well stirred and again strained into the receiving-vessel. By this means such portions of the logwood as were rendered insoluble by the action of the potash are separated from the soluble portion. The strained solution is then thoroughly agitated, when it is allowed to stand undisturbed until a deposit settles to the bottom. When the deposit is completed, the top liquid is poured off, by which means a portion of the logwood which has not been fully acted on by the potash is got rid of and the deposited matter is put into a shallow vessel and dried spontaneously or by moderate heat. When fully dry, it is finely powdered, producing a fine black powder, which is soluble in water, and which I call "powdered soluble logwood-black." Two or three parts of this powdered soluble logwood-black are then well mixed with one part of freshly-slaked lime, when sufficient water is added to make a watery mass or thin batter, which is then dried spontaneously or by moderate heat, when it is finely powdered, and this I call "powdered soluble logwood-black with lime." It is best to let this mixture stand for a little time, as it undergoes some change, which improves it for the purpose intended. Black prepared from tannic or gallic acid, as found in nut-galls and many vegetable substances, or blacks made by combinations of reds, yellows, and blues or greens, or blacks produced by oxidizing or carbonizing kermes, carmines, and similar substances, or any black which can be prepared in a dry mass or powder sufficiently soluble in water, may be united with or substituted for the logwood.

To better adapt the powdered soluble logwood-black for copying directly from paper, I use in combination with it a black made from reds, yellows, and blues or greens, which are prepared as follows:

The red is made by taking any required quantity of carmine of fair quality (that known as "No. 40" answering very well, or simple cochineal will do) and adding to it a saturated solution of borax in water in quantity sufficient to completely dissolve carmine, or a little in excess. When the solution is completed, it is poured into a shallow vessel and dried spontaneously or by gentle heat. When dry, the carmine, now in combination with the borax, is collected and finely powdered. This produces a carmine powder very soluble in water, which I call "powdered soluble carmine." The mixture of the carmine and borax may be made by simply grinding or triturating the two together in the proper proportions; but the union will be less complete than by the mode of solution. Two or three parts of the powdered soluble carmine are then mixed with one part of slaked lime and sufficient water to make a watery mass or thin batter, which is then dried and finely powdered, and this I call "soluble carmine with lime;" or, instead of carmine, the red may be made by using Brazil wood in the form of the extract, which may be brought to a red resembling carmine in different ways; but the mode preferred is to add to two or three parts of powdered extract of Brazil wood one part of slaked lime, which is mixed thoroughly with water into a thin paste and then dried and powdered, and this I call "powdered extract of Brazil wood with lime."

For the carmine or Brazil wood other reds may be substituted—such as kermes, madder, or any red which can be prepared in a dry mass or powder sufficiently soluble in water.

The blue is obtained by making an extract of indigo by any of the ordinary methods, or by taking the extract of indigo or indigotine as found in the market, preferably such in which the acid employed in its manufacture has been well neutralized. This is finely powdered, and I call it "powdered soluble indigo." One part of slaked lime is then added to two or three parts of this powdered soluble indigo and made into a thin paste with water, which is dried by moderate heat and powdered, and this I call "powdered soluble indigo with lime."

The yellow is obtained by taking fustic in the form of the extract and reducing it to a fine powder, which I call "powdered extract of fustic." Of this powdered extract of fustic two or three parts are mixed with one part of slaked lime and sufficient water to make a thin mass, which is dried and powdered, and this I call "powdered extract of fustic with lime." For the fustic other yellows may be substituted—such as gamboge, saffron, vegetable coloring-matters which strike a yellow with alkalies or metallic salts, or such as can be prepared in a dry mass or powder sufficiently soluble in water.

The green is prepared by mixing one part of the powdered soluble indigo and about five parts of the powdered extract of fustic, before described, in about sixteen parts of water. The mixture is best effected by first dissolving the fustic in the water and then adding the indigo. The water is then evaporated spontaneously or by gentle heat, and the dry mass is finely powdered, producing a green powder very soluble in water, which I call "powdered soluble green." The mixture of the blue and yellow may also be effected, though in a less complete form, by simply grinding or triturating the proportions of the two powders together. By varying the proportions of either the blue or the yellow different shades of green are produced. Two or three parts of this powdered soluble green are mixed with one part of slaked lime and water sufficient to make a thin mass, which is then dried and powdered, and this I call "powdered soluble green with lime." Any yellow and blue soluble in water or made soluble may be used to form a substitute for the green. I now take of the powdered extract of fustic about one part, of the powdered soluble carmine about four parts, and of the powdered soluble green about eight parts, and work them into a thin mass with water, which is then dried and powdered. This produces a blackish powder soluble in water, which I call "powdered combination black." Two or three parts of this powdered combination black are mixed with one part of slaked lime and water sufficient to make a thin mass, which is dried and powdered, and I call this "combination black with lime." For the powdered extract of fustic the powdered soluble carmine and the powdered soluble green in this combination black any other soluble yellows, reds, and greens or blues may be substituted. The colors, when prepared as described, or in similar ways, can then be put into the shapes and forms before mentioned by various modes, means, or substances. One way by which I make the black pencil is by combining the powdered soluble logwood-black and the powdered soluble logwood-black with lime, before described, with powdered hard soap, preferably such as is neutral, and powdered mineral wool in about the following proportions: powdered soluble logwood-black, eight parts; powdered soluble logwood-black with lime, one part; powdered combination black, twelve parts; powdered mineral wool, two parts, and powdered hard soap, four parts. These are mixed together, and the whole is then worked into a mass with a solution of ox-gall and soap. This solution is made by dissolving dried or inspissated ox-gall in water until the water assumes a muddy dark color, when it is set aside until the insoluble portions of the bile has settled to the bottom. The clear, dark liquid on top is then poured off, and to two parts of this clear solution one part of powdered hard soap is added, effecting a union of the two in the form of a thin paste by rubbing or trituration. This paste is then added to the mass in quantity sufficient to moisten it, and the whole is thoroughly intermixed or combined by rubbing, grinding, or otherwise. It is brought to a state which may be described as simply moist, and can then be rolled or pressed in molds, or forced through holes, as in the manufacture of the ordinary lead-pencil, thus forming flat, square, or round wire-like pieces or cores, as may be desired, and of any thickness or length required. These are dried, and may then be placed in wood, like the common lead-pencil, or used in holders adapted for the purpose. When so completed, a pencil is produced which makes a mark on paper and other substances like the ordinary lead-pencil, and which can be transferred or copied by pressure on moist tissue or other paper, producing a readable and permanent black copy. The mineral wool serves alike as an aid to hold the pencil in form and to separate the particles of color to be deposited on the paper in the act of writing, and some of the pigments or dye-stuffs or talc, tripoli, emery, some of the clays, starch, the ashes of paper, and similar substances may be used in connection with or substituted for it, and they may be similarly used with or substituted for the lime. The soap, which may be used in varied proportions, or in combination with substitutes or equivalents mentioned herein, serves the purpose of enabling the pencil to make a mark or write on or over such portions of the paper as have been soiled or touched by the fingers or hand, and with some combination of the substances described an equivalent is found for it in borax and some of the salts of potash. Some of the cements, gums, and similar adhesive agents may be used in connection with the ox-gall and soap-paste or substituted therefor.

The powdered combination black and the powdered combination black with lime described, taken alone, or united with other blacks or blacks similarly prepared, are also capable of being made into a copying-pencil by the modes and means described. They serve the double purpose of acting as a supplier of color and to some extent as a binder of the mass with which they are united. I do not confine myself strictly to the proportions or formula before given as one way of making the black pencil, but deviate therefrom in certain ways within the scope of the descriptions herein given to produce pencils adapted for different uses and of different degrees of hardness. Thus, to obtain pencils specially designed to deposit a large amount of coloring-matter on the paper, I omit some of the substances named in the formula, or use in the place thereof some of the substitutes mentioned, by which means a pencil is obtained which will give from ten to twenty copies of the writing or drawing made with it if transferred to the composition for copying before mentioned; and if the pencil be made very soft and handled with extreme care, from twenty to thirty copies may be obtained, according to the size and character of the original.

By using separately each of the soluble colors before described copying-pencils of different colors are obtained. Thus, by combining the powdered soluble carmine and the powdered soluble carmine with lime, or the powdered extract of Brazil wood with lime, with powdered mineral wool and soap in about the same proportions as for the black, and proceeding as described for the black, a red copying-pencil is produced; or it may also be obtained by combining the powdered soluble carmine with red pigments, such as vermillion, red lead, and the like, or the reds now employed for making the ordinary non copying lead-pencils and crayons, the coloring-matter of the pigments remaining on the original, while the soluble color combined with them is transferred to the copy. By proceeding in the same way with the powdered extract of fustic, and the powdered extract of fustic with lime for the yellow, and with the powdered soluble green and the powdered soluble green with lime for the green, yellow and green pencils are respectively produced; or they also may be made by combining the powdered extract of fustic and the powdered soluble green described with pigments of their respective colors, such as chrome for the yellow, and green verditer, copper, and the like for the green. The blue pencil is best made by uniting the powdered soluble indigo and the powdered soluble indigo with lime with the pigments commonly used for ordinary blue pencils and crayons, such as blue verditer, imitation cobalt-blue, and similar blues, or with common indigo finely powdered, and proceeding as before stated for the black; or a pencil which does not make a blue mark, the mark resembling that made by the ordinary lead-pencil, but which gives a fine blue copy, may be made by uniting the powdered soluble indigo with the powdered soluble logwood-black and the powdered soluble logwood-black with lime.

By varying the proportions of the powdered soluble colors used different shades of the respective colors are obtained, and by an intermixture of the powdered soluble colors in varied proportions pencils of different colors and shades thereof are produced. Thus, a mixture of the red with the blue gives a purple or violet copying-pencil, the shade of which is governed by varying the proportions of either the red or blue employed. A mixture of the red with the black gives a brown, and so on through a variety of shades of color. The pencils so made all produce copies of their respective colors on moist paper by pressure, and from one to six copies and upward on the composition for copying before mentioned, according to the color and softness of pencil, excepting the yellow, which in pencil, crayon, or pastel form has but faint copying powers, while in the other forms named it produces good copies.

All the pencils are made by taking the powdered soluble colors and the powdered soluble colors with lime and mineral wool and soap and uniting them with the ox-gall and soap-paste, as described for the black, and the substitutes for the lime and mineral wool mentioned for the black answers a similar purpose with the other colors.

Copying crayons and pastels of the different colors and shades thereof are made like the pencils and pressed in molds giving them the required forms, differing from the pencils only in form.

To put colors into the other shapes or forms mentioned, almost any adhesive substance may be used—such as sugars, pastes, gums, cements, or whatever will hold the mass together. I take the powdered soluble logwood-black and work it into a mass with mucilage of gum-arabic. When thoroughly worked up by rubbing or grinding, it is pressed in molds to form pieces or sticks about two inches long, half an inch wide, and a quarter inch thick, which are then dried, producing pieces which resemble the ordinary sticks of India or Chinese ink. Any size, shape, or form may be made and the pieces covered with foil or other material; or the sticks may be made by first making a very thick solution of the powdered soluble logwood-black in glycerine, which will serve the purpose of a mucilage or cement. This solution is added to the dry powdered soluble logwood-black in quantity required to barely dampen it, and then a little water or a thin solution of gum-arabic in water is added to render the mass sufficiently soft or plastic to be rubbed up or ground to the requisite fineness. For use, the stick so made is rubbed up with a little water in a small dish or cup, whereby an ink is obtained, the body or strength of which may be regulated to any degree required. When rubbed to a limited degree, it produces an ordinary black writing-ink; and if this be made a little thicker by further rubbing an ink is produced which will make a copy on moist tissue or other paper by pressure like ordinary copying-ink, and if still further rubbed up to the proper thickness an ink is obtained of such power that writings or drawings made with it will make several copies on moist paper and from ten to twenty copies and upward if transferred on the composition for copying before mentioned, according to the size and character of the original. The mass as used for making the sticks is also formed in molds into cakes or tablets of different sizes, one of which is about one inch long, half an inch wide, and about an eighth of an inch thick, resembling the ordinary water-color cakes or tablets. For use these may be rubbed up with water, as described, or they may be otherwise used with pen or brush for drawing, painting, and other purposes, from which copies may be obtained in the same way and of like character and number as with the sticks before described.

The red, blue, green, and yellow powdered soluble colors are also each made into sticks and cakes or tablets, like the black, and by the same means and ways as described for the black. They are used in the same way and for similar purposes, and produce inks and paints of their respective colors of any body or strength required. Writings, drawings, paintings, &c., made with them with pen or brush will produce copies on moist paper and on the composition for copying before mentioned varying in number from one to two or three on paper and from one to twenty and upward on the composition, according to the color employed.

The compounds and combinations mentioned may be varied within the scope of the invention. For example, for any of the elements or materials named in the claims or in the description or referred to therein, the substitutes mentioned in the specification and other substitutes may be used instead thereof, and the equivalents of any of the materials or substitutes may be employed therefor.

By mixing the colors in various proportions and then making them into the forms described a variety of different colors and shades thereof are obtained; also, all the colors can be used singly or together, and they may also be blended in the usual ways, thus furnishing resources in convenient forms for artists, draftsmen, scholars, and others which will enable them to obtain permanent copies of their work which will be true fac-similes.

I claim—

1. A composition of matter for pencils, crayons, and such articles, consisting, substantially, of a soluble color, (described,) eight parts, a soluble color with lime, (described,) one part, mineral wool two parts, soap four parts, and ox-gall and soap-paste, (described,) substantially as and for the purposes set forth.

2. A composition of matter for pencils, crayons, and such articles, consisting, substantially, of a soluble color, (described,) a soluble color with lime, (described,) mineral wool, soap, and ox-gall and soap-paste, (described,) substantially as and for the purposes set forth.

3. A composition of matter for pencils, crayons, and such articles, consisting, substantially, of soluble colors, (described,) lime, mineral wool, soap, and ox-gall, as specified, substantially as and for the purposes set forth.

4. A composition of matter for pencils, crayons, and such articles, consisting, substantially, of a soluble color, (described,) a soluble color with lime, (described,) mineral wool, soap, and ox-gall, substantially as and for the purposes set forth.

5. In a composition of matter for pencils, crayons, and such articles, the combination of a soluble color, (described,) and lime, substantially as and for the purposes set forth.

6. In a composition of matter for pencils, crayons, and such articles, the combination of mineral wool and a soluble color, (described,) substantially as and for the purposes set forth.

7. In a composition of matter for pencils, crayons, and such articles, the combination of soap and a soluble color, (described,) substantially as and for the purposes set forth.

In testimony whereof I hereunto subscribe my signature and affix my seal, in the presence of two witnesses, in the city, county, and State aforesaid, the 17th day of October, 1885.

HENRY S. MYERS. [L. S.]

Witnesses:
 S. A. EMANUEL,
 R. CHARLES.